United States Patent Office 3,242,302
Patented Mar. 22, 1966

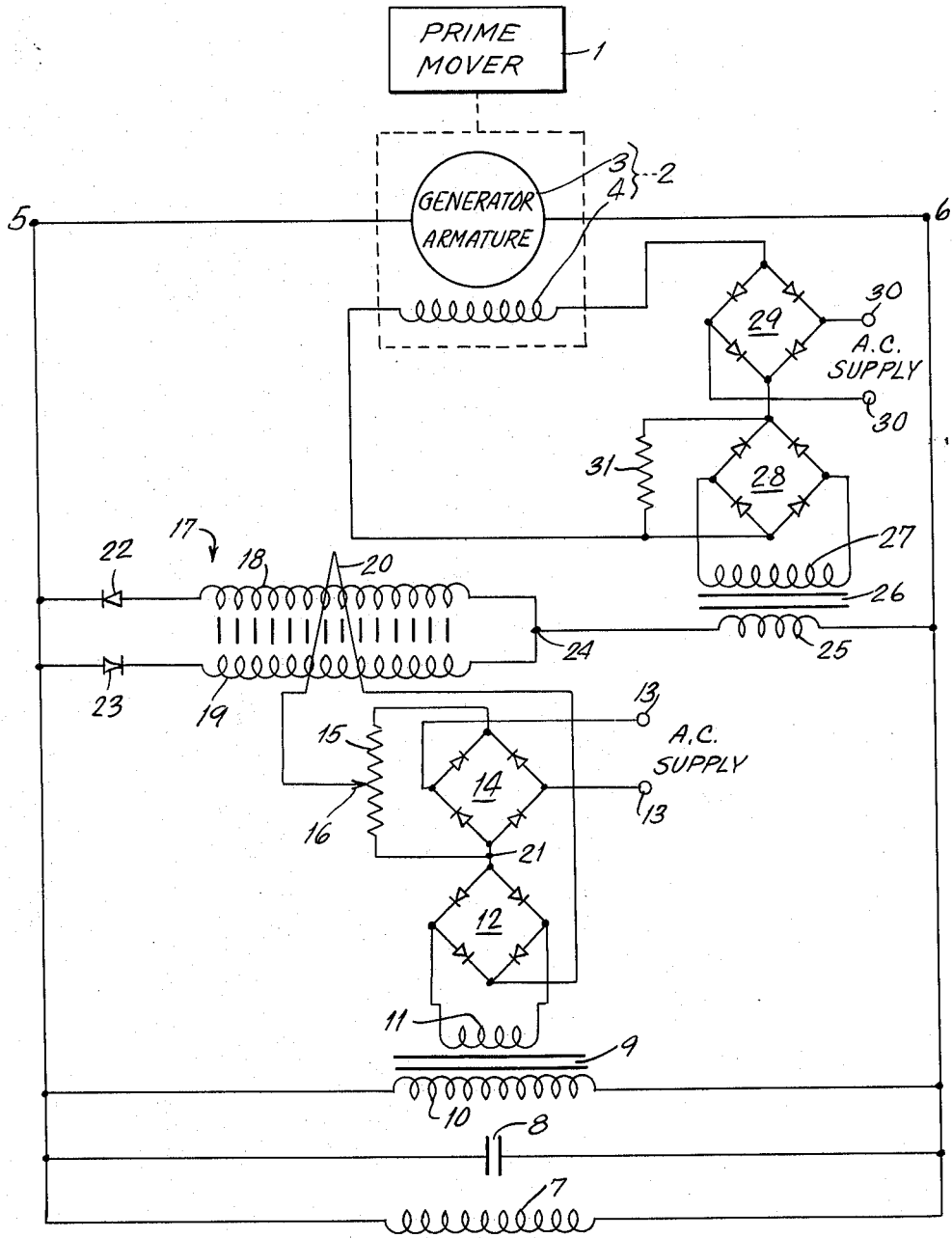

3,242,302
VOLTAGE AND CURRENT REGULATING APPARATUS FOR INDUCTION HEATING GENERATOR
Thomas O. Williams, Madison, Ohio, assignor to Republic Steel Corporation, Cleveland, Ohio, a corporation of New Jersey
Filed July 9, 1963, Ser. No. 293,709
7 Claims. (Cl. 219—10.77)

This invention relates to the regulation of the output current and voltage of a generator supplying the heating coil of an induction furnace.

In induction heating furnaces, it is common to insert and remove workpieces while the generator is left connected to the heating coil. The load on the generator changes rapidly when workpieces are inserted and removed. This change in load results in rapid variation of the output power factor of the generator, and may be effective to magnetize and demagnetize the generator armature, thereby changing the output voltage.

It is common practice to connect a power factor correcting capacitor across the load so as to balance to some extent the inductive and capacitive loads. Commonly, such a power factor correcting capacitor is designed to give a power factor between 0.95 and 0.98 leading when the generator is fully loaded.

Such a capacitor gives good efficiency at full load. When the workpiece is withdrawn from the induction furnace, the leading current drawn by the capacitor is much greater than the lagging current drawn by the furnace coil so that the power factor becomes strongly leading, and the generator voltage output is greatly increased. The usual type of voltage regulating apparatus responds to this situation by decreasing the generator field current. If the load is sufficiently capacitive, it may be impossible for the regulator to bring the voltage down to a safe value. Furthermore, even if the field current control regulator is effective, it will be sluggish in its operation due to the high inductance in the field circuit so that the undesirable high voltage may persist for an appreciable period of time.

It has been proposed to avoid the condition just described by switching capacitors to insert a smaller capacitor when the inductive reactance of the furnace is decreased by removal of the workpiece. Such a switching arrangement is sometimes too slow to keep up with the rapid change in generator voltage. Furthermore, it produces undesirable voltage and power transients in the circuit.

It has also been proposed to regulate the output voltage of a generator by imposing an inductively reactive load on it whenever the terminal potential exceeds a predetermined value. Such an arrangement requires an artificial inductive load having a current rating substantially equal to the maximum expected change in the furnace coil inductive current.

An object of the present invention is to provide an improved current voltage regulating apparatus for use with a generator supplying current to the coil of an induction furnace.

A further object is to provide improved regulating apparatus of the type described which responds to an increase in voltage at the furnace coil by increasing the inductive load on the generator and also by decreasing the current flow through the generator field.

A further object is to provide improved voltage and regulating apparatus of the type described which becomes effective only when the voltage at the furnace coil exceeds a predetermined value.

Another object is to provide an apparatus of the type described in which the added inductive load is supplied by a saturable reactor.

The foregoing and other objects of the invention are attained in the apparatus described herein. In that apparatus, a saturable reactor has an output winding connected in series with the primary winding of a transformer, that series combination being connected in parallel with the furnace coil. The saturable reactor has a control winding whose current is determined by the balance between two series opposed voltages. On is a reference voltage and the other is a voltage corresponding in magnitude to the potential across the furnace coil. The transformer has a secondary winding supplying a rectifier bridge. The output of this rectifier bridge is connected in series with a current supply for the generator field, and is effective to decrease the current flow through the generator field as the current flow through the saturable reactor increases.

Other objects and advantages of my invention will become apparent from a consideration of the following specification and claims, taken together with the accompanying drawing.

The single figure of the drawing is a wiring diagram of voltage and current regulating apparatus embodying the invention.

There is shown in the drawing a prime mover 1 driving a generator 2 including an armature 3 and a field 4. The terminals of the generator armature are shown at 5 and 6 and are connected directly to the terminals of a coil 7 which may be the work coil of an induction furnace and which is the principal load on the generator. A power factor correcting capacitor 8 is connected in parallel with the coil 7.

A voltage transformer 9 has a primary winding 10 connected in parallel with the coil 7 and a secondary winding 11 connected to the input terminals of a rectifier bridge 12. The terminals 13 of an alternating current supply are connected to the input terminals of another rectifier bridge 14. A resistor 15 having a sliding contact 16 is connected across the output terminals of the bridge 14.

A saturable reactor 17 has a pair of output windings 18 and 19 and a control winding 20. The control winding 20 is connected in series with that portion of the resistor 15 between the slider 16 and the lower terminal 21 thereof as it appears in the drawing and also in series with the output terminals of the rectifier bridge 12. Thus the output of the rectifier bridge 12 is connected in series with a portion of the output of the rectifier bridge 14, that portion being determined by the setting of the contact 16. The potential at the output terminals of the rectifier bridge 12 is connected in opposition to the potential between the slider 16 and the terminal 21. Consequently, when there is no voltage at the terminals of the coil 7, the rectifier bridge 12 has no output and the current in the control winding 20 is only that determined by the potential between slider 16 and terminal 21. The slider 16 should be so adjusted and the characteristics of the transformer 9 and the bridges 12 and 14 be so seleced that when the potential across the work coil 7 is at its rated value, the output of the rectifier bridge 12 is just slightly larger than the potential between slider 16 and terminal 21, and hence there is only a small current flowing in the control winding 20. The reactor 17 then has its core unsaturated and presents a high impedance to any current flowing in its output windings, so that the output winding current is then very small.

When the potential at the terminals of the coil 7 exceeds its rated value, then current starts to flow in the winding 20 and increases with increasing terminal voltage at the load coil 7. Thus, adjustment of the contact 16 is effective to set a threshold value of potential across the coil 7, below which there is little or no control current flowing in the winding 20.

The output winding 18 of the saturable reactor 17 is connected through a diode 22 to the terminal 5. The output winding 19 is connected through an oppositely poled diode 23 to the terminal 5. The other terminals of the windings 18 and 19 are connected together at a terminal 24, which is also connected to one terminal of a primary winding 25 of a current transformer 26. The other terminal of transformer winding 25 is connected to the generator terminal 6.

The transformer 26 has a secondary winding 27 connected to the input terminals of a rectifier bridge 28. Another rectifier bridge 29 has its input terminal connected to the terminals 30 of an alternating current supply. A resistor 31 is connected across the output terminals of the rectifier bridge 28. Resistor 31 and the output terminals of the bridge 29 are connected in series with the field winding 4 of the generator.

OPERATION

When there is little or no current flowing in the control winding 20, as when the terminal potential across the coil 7 is near its rated value, then the windings 18 and 19 have a high impedance, and there is little current flowing through them and through the primary winding 25. When the potential across the coil 7 greatly exceeds its rated value, the current flow through the control winding 20 increases, thereby saturating the core of the reactor 17 very early in each half cycle, thereby decreasing the effective inductance of the windings 18 and 19, and increasing the flow of current through those windings and through the primary winding 25. The current in the primary winding 25 induces a current in the secondary winding 27 which is rectified by the bridge 28 and flows from the output terminals of that bridge through the resistor 31, in the same direction as the current from the output terminals of the bridge 29. The potential drop across resistor 31 is thereby increased and is effective to reduce the current flow through the field winding 4, thereby reducing the voltage generated in the armature 3.

The increased current flow in the windings 18 and 19 is effective at the same time to increase the inductive load on the generator 2, thereby balancing to some extent the decrease in inductive load at the coil 7 which caused the increase in potential across the coil.

Thus, it may be seen that the system responds to an increase in the load voltage above a predetermined value by: (1) applying an increased inductive load across the armature; and (2) decreasing the current through the field 4. Both of these effects have the result of reducing the excessive terminal voltage at the coil 7. The increased current through the saturable reactor 17 operates by bringing the inductive load on the generator more nearly into balance with the capacitive load provided by the power factor correcting capacitor 8. The reduction in the field current is effective to reduce the potential at the work coil 7 by reducing the potential generated in the armature 3.

These two responses to an increase in potential across the load coil 7 continue to increase until their combined effects bring about a cessation of further increase in that potential, whereupon a condition of equilibrium is attained.

A saturable reactor such as that illustrated is the presently preferred form of inductive impedance means for balancing the load on the generator. Other possible alternative structures for producing similar effects include: (1) a movable core reactor having its core positioned in response to the current flow in the circuit of control winding 20; (2) a switched capacitor including means for controlling its reactive load; and (3) a variable capacitor of the movable plate type connected in a suitable network.

While I have shown and described the preferred embodiment of my invention, other modifications thereof will readily occur to those skilled in the art, and I therefore intend my invention to be limited only by the appended claims.

I claim:
1. Voltage and current regulating apparatus including:
 (a) a generator having an armature and a field;
 (b) an induction furnace coil connected to receive current from the generator armature;
 (c) a saturable reactor having an output winding connected to receive current from the generator armature and a control winding;
 (d) a transformer having a primary winding connected in parallel with the furnace coil and a secondary winding;
 (e) a rectifier connected across said secondary winding;
 (f) a source of reference potential connected in opposition to the output of said rectifier;
 (g) means connecting said rectifier output and said source in series with the control winding of the saturable reactor;
 (h) a second transformer having a primary winding and a secondary winding, said primary winding being connected in series with the output winding of the saturable reactor;
 (i) a second rectifier connected across the secondary winding of the second transformer;
 (j) a source of energizing current in the generator field; and
 (k) network means connecting said current source and the output of said second rectifier and the generator field, with said second rectifier output opposing said current source.

2. In a regulating apparatus comprising a generator having a field and an armature, and a reactive load connected to the armature, the improvement comprising:
 (a) reactive impedance means connected to receive current from said armature,
 (b) means responsive to the output from the generator armature for controlling said reactive impedance means so that reactive current is drawn from said generator armature in substantial phase opposition to reactive current supplied to said reactive load from said armature to counteract the reactive current supplied to the reactive load, and
 (c) means responsive to the output from the generator armature for controlling the excitation of said generator field.

3. In a regulating apparatus comprising a generator having a field and an armature, an inductive load connected to the armature, and a capacitive impedance coupled to the load, the improvement comprising means for counteracting the high capacitance presented to the armature which causes a high potential to be generated by the armature when the inductance of the inductive load decreases substantially, said means comprising:
 (a) inductive impedance means connected to receive current from said armature,
 (b) first means responsive to the potential across the load for controlling the current through the inductive impedance means from said armature and effective in response to an increase in said potential to cause an increase in said current, and
 (c) second means responsive to the potential across the load for controlling current in said field and effective in response to an increase in said potential to cause a decrease in the field current.

4. Apparatus as defined in claim 3, in which said inductive impedance means is a saturable reactor with an output winding and a control winding, said first potential responsive means controls the current through said control winding, and said load comprises an induction furnace coil.

5. Apparatus as defined in claim 3, in which said first and second potential responsive means comprises means for setting a threshold value of said potential below which there is substantially no control of the current through the inductive impedance means, and said last-mentioned current is at a relatively low value.

6. Apparatus as defined in claim 5, in which said threshold setting means is effective both for the current flow through the inductive impedance means and the field current.

7. In a regulating apparatus comprising a generator having a field and an armature, an inductive load connected to the armature, and a capacitive impedance coupled to the load, the improvement comprising means for counteracting the high capacitance presented to the armature which causes a high potential to be generated by the armature when the inductance of the inductive load decreases substantially, said means comprising:
 (a) inductive impedance means connected to receive current from said armature,
 (b) first means responsive to the potential across the load for controlling the current through the inductive impedance means from said armature and effective in response to an increase in said potential to cause an increase in said current, and
 (c) means responsive to the current through the inductive impedance means from said armature for contolling current in said field and effective in response to an increase in said inductive impedance means current to cause a decrease in the field current.

References Cited by the Examiner
UNITED STATES PATENTS

| | | | |
|---|---|---|---|
| 2,140,349 | 12/1938 | Dawson | 322—75 |
| 2,558,572 | 6/1951 | Logan | 322—75 |
| 2,706,764 | 4/1955 | Mitchell | 219—503 |
| 2,720,579 | 10/1955 | Morgan | 219—503 |
| 2,748,241 | 5/1956 | Mohr | 219—10.77 |
| 2,752,473 | 6/1956 | Hage | 219—503 |
| 2,856,498 | 10/1958 | Jones | 219—10.75 |
| 3,035,143 | 5/1962 | Leatherman | 219—10.77 |

FOREIGN PATENTS

| | | |
|---|---|---|
| 834,163 | 11/1938 | France. |

References Cited by the Applicant
UNITED STATES PATENTS

| | | |
|---|---|---|
| 2,186,847 | 1/1940 | Troger. |
| 3,105,185 | 9/1963 | Miron. |

RICHARD M. WOOD, *Primary Examiner.*